US010386998B2

(12) United States Patent
Yamamoto et al.

(10) Patent No.: US 10,386,998 B2
(45) Date of Patent: Aug. 20, 2019

(54) RESIZING A RESPONSE REGION OF A MOVING OBJECT

(71) Applicant: CANON KABUSHIKI KAISHA, Tokyo (JP)

(72) Inventors: Yutaka Yamamoto, Yokohama (JP); Takuro Miyajima, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 154 days.

(21) Appl. No.: 15/189,518

(22) Filed: Jun. 22, 2016

(65) Prior Publication Data
US 2016/0378280 A1 Dec. 29, 2016

(30) Foreign Application Priority Data

Jun. 25, 2015 (JP) ................. 2015-127892

(51) Int. Cl.
G06F 3/0482 (2013.01)
G06F 3/0484 (2013.01)
G06F 3/0488 (2013.01)
H04N 5/232 (2006.01)

(52) U.S. Cl.
CPC .......... *G06F 3/0482* (2013.01); *G06F 3/0488* (2013.01); *G06F 3/04845* (2013.01); *H04N 5/23216* (2013.01)

(58) Field of Classification Search
CPC ... G06F 3/0482; G06F 3/04845; G06F 3/0488
See application file for complete search history.

(56) References Cited

U.S. PATENT DOCUMENTS

| 5,627,567 A | * | 5/1997 | Davidson | G06F 3/0488 345/170 |
| 5,675,755 A | * | 10/1997 | Trueblood | G06F 3/0481 715/791 |
| 5,757,358 A | * | 5/1998 | Osga | G06F 3/04842 345/157 |
| 6,538,663 B2 | * | 3/2003 | Kamei | H04N 7/181 345/635 |
| 8,381,118 B2 | * | 2/2013 | Minton | G06F 3/04886 345/168 |
| 2008/0165160 A1 | * | 7/2008 | Kocienda | G06F 3/04883 345/175 |

(Continued)

FOREIGN PATENT DOCUMENTS

| CN | 102281206 A | 12/2011 |
| CN | 103513924 A | 1/2014 |

(Continued)

*Primary Examiner* — Amy M Levy
(74) *Attorney, Agent, or Firm* — Canon USA, Inc., IP Division

(57) ABSTRACT

An information processing apparatus includes a touch panel, a display control unit configured to perform control so that a moving object and a different object from the moving object are displayed on a display screen of the touch panel, wherein a display position of the moving object can be moved, and a control unit configured to set a response region for receiving a touch operation with respect to the moving object, wherein, in a case where the moving object overlaps the different object, the control unit reduces the response region of the moving object.

8 Claims, 5 Drawing Sheets

(56) References Cited

U.S. PATENT DOCUMENTS

| | | | |
|---|---|---|---|
| 2009/0058821 A1* | 3/2009 | Chaudhri | G06F 3/04817 |
| | | | 345/173 |
| 2009/0228837 A1* | 9/2009 | Suzuki | B60K 35/00 |
| | | | 715/841 |
| 2010/0079405 A1* | 4/2010 | Bernstein | G06F 3/04883 |
| | | | 345/174 |
| 2011/0083104 A1* | 4/2011 | Minton | G06F 3/04886 |
| | | | 715/815 |
| 2011/0164054 A1* | 7/2011 | Murakami | G06F 3/0481 |
| | | | 345/635 |
| 2014/0359438 A1* | 12/2014 | Matsuki | G02B 7/36 |
| | | | 715/702 |
| 2015/0026637 A1* | 1/2015 | Ross | G06F 3/0481 |
| | | | 715/810 |
| 2015/0268807 A1* | 9/2015 | Truong | G06F 3/0484 |
| | | | 715/800 |
| 2017/0308214 A1* | 10/2017 | Nakagawa | G06F 3/0412 |

FOREIGN PATENT DOCUMENTS

| | | |
|---|---|---|
| JP | H06-314167 A | 11/1994 |
| JP | 2001-321562 A | 11/2001 |
| JP | 2013-101630 A | 5/2013 |
| JP | 2013-182463 A | 9/2013 |

\* cited by examiner

RESIZING A RESPONSE REGION OF A MOVING OBJECT

BACKGROUND OF THE INVENTION

Field of the Invention

The present disclosure generally relates to information processing and, more particularly, to an information processing apparatus, an information processing method, and a storage medium.

Description of the Related Art

Conventionally, there has been known a device for, in an information processing apparatus including a touch panel, displaying an object such as a button on a display screen, detecting on the touch panel an operation with respect to the object, and controlling the operation. A response region for receiving a touch operation with respect to the object is set for the object.

In Japanese Patent Application Laid-Open No. 2013-182463, if a touch operation is performed to an icon (an object), the response region of the touched icon is enlarged, thereby improving the operability of a touch panel.

SUMMARY OF THE INVENTION

The present disclosure is directed to improving the operability of a touch operation not only to a normal object but also to a moving object the display position of which can be moved.

In particular, the present disclosure is directed to improving the operability of objects in a case where the moving object overlaps another object or the response region of another object.

According to an aspect of the present disclosure, an information processing apparatus includes a touch panel, a display control unit configured to perform control so that a moving object and a different object from the moving object are displayed on a display screen of the touch panel, wherein a display position of the moving object can be moved, and a control unit configured to set a response region for receiving a touch operation with respect to the moving object, wherein, in a case where the moving object overlaps the different object, the control unit reduces the response region of the moving object.

Further features of the present disclosure will become apparent from the following description of exemplary embodiments with reference to the attached drawings.

DESCRIPTION OF THE EMBODIMENTS

Various exemplary embodiments of the present disclosure will be described below with reference to the drawings.

Figure 1:
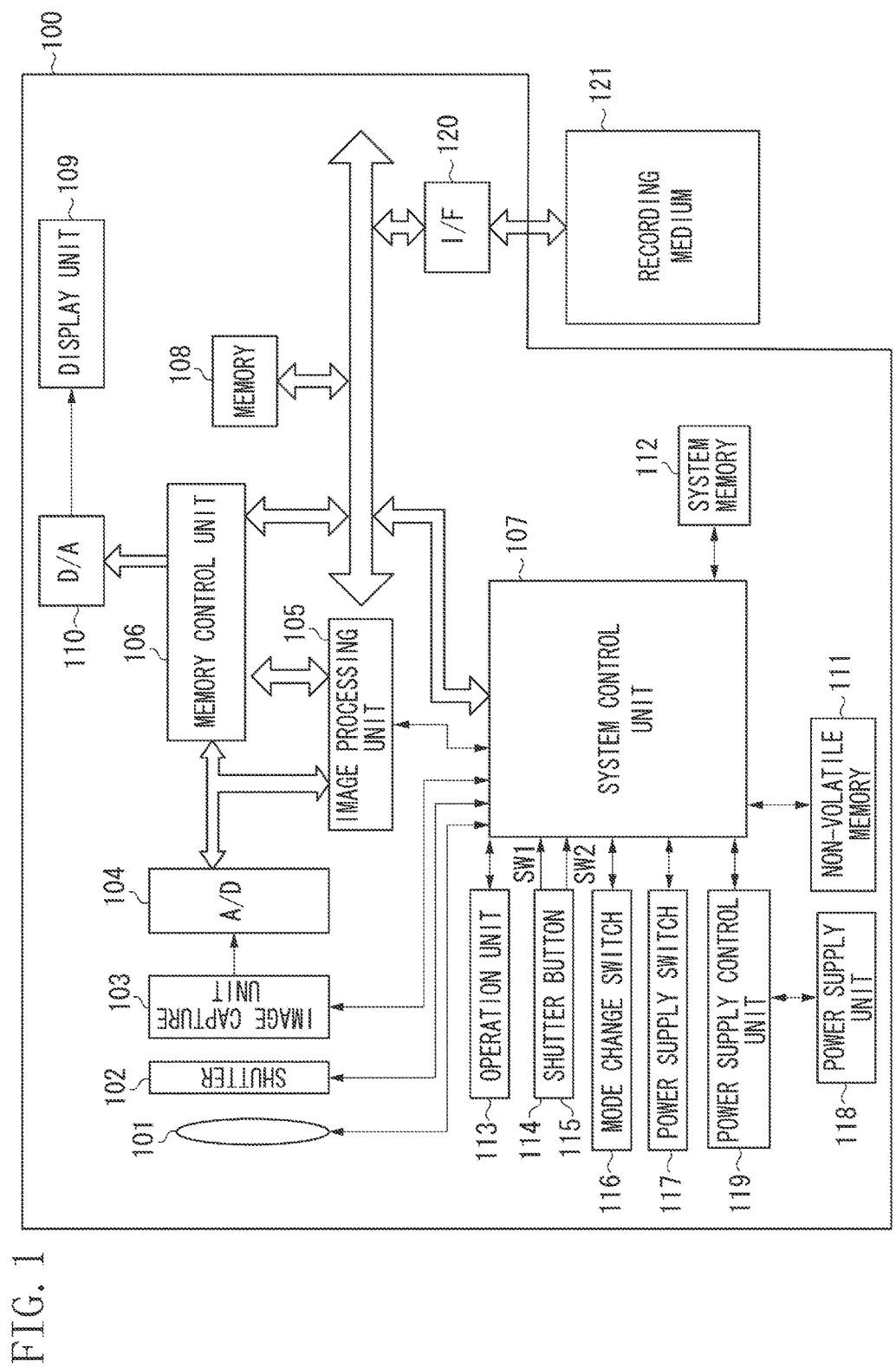
FIG. 1 is a diagram illustrating a configuration of a digital camera.

FIG. 1 is a diagram illustrating a configuration of a digital camera (hereinafter, referred to as a "camera") according to an exemplary embodiment. A camera 100 is an example of an information processing apparatus. A photographing lens 101 is a lens group including a zoom lens and a focus lens. A shutter 102 is a shutter having a diaphragm function. An image capture unit 103 is an image sensor including a charge-coupled device (CCD) or a complementary metal-oxide-semiconductor (CMOS) device, which converts an optical image into an electric signal. An analog-to-digital (A/D) converter 104 converts an analog signal into a digital signal. The A/D converter 104 is used to convert an analog signal output from the image capture unit 103 into a digital signal. As used herein, the term "unit" generally refers to any combination of software, firmware, hardware, or other component, such as circuitry, that is used to effectuate a purpose.

An image processing unit 105 performs a resizing process, such as predetermined pixel interpolation and reduction, and a color conversion process on data from the A/D converter 104 or data from a memory control unit 106. Further, the image processing unit 105 performs a predetermined calculation process using captured image data. Then, a system control unit 107 performs exposure control and distance measurement control based on the obtained calculation result. Consequently, an autofocus (AF) process, an automatic exposure (AE) process, and a pre-flash (EF) process are performed by a through-the-lens (TTL) method. The image processing unit 105 also performs a predetermined calculation process using captured image data and performs an auto white balance (AWB) process and an International Organization for Standardization (ISO) sensitivity process by the TTL method based on the obtained calculation result.

Output data from the A/D converter 104 is written directly to a memory 108 via the image processing unit 105 and the memory control unit 106 or via the memory control unit 106. The memory 108 stores image data obtained by the image capture unit 103 and converted into digital data by the A/D converter 104 and image data to be displayed on a display unit 109. The memory 108 includes a sufficient storage capacity for storing a predetermined number of still images and a moving image and a sound of a predetermined length of time.

Further, the memory 108 doubles as a memory for image display (a video memory). A digital-to-analog (D/A) converter 110 converts data for image display stored in the memory 108 into an analog signal and supplies the analog signal to the display unit 109. Consequently, image data for display written in the memory 108 is displayed on the display unit 109 via the D/A converter 110. The display unit 109 performs display on a display device such as a liquid crystal display (LCD) according to an analog signal from the D/A converter 110. Analog signals are once converted into digital signals by the A/D converter 104, and the digital signals are accumulated in the memory 108 and converted into analog signals by the D/A converter 110. Then, the analog signals are sequentially transferred to and displayed on the display unit 109. This enables the display unit 109 to function as an electronic viewfinder and perform through-image display.

A non-volatile memory 111 is an electrically erasable and recordable memory and is, for example, an Electrically Erasable Programmable Read-Only Memory (EEPROM). The non-volatile memory 111 stores a constant and a program for the operation of the system control unit 107. The term "program" generally refers to a program for performing the processing of various flow charts described later in the present exemplary embodiment.

The system control unit 107, which may include one or more processors and one or more memories, controls the entirety of the camera 100. The system control unit 107 executes the above program recorded in the non-volatile memory 111, thereby achieving the processes described later in the present exemplary embodiment. A system memory 112 is a random-access memory (RAM). A constant and a variable for the operation of the system control unit 107 and a program read from the non-volatile memory 111 are loaded into the system memory 112. Further, the system control unit 107 also controls the memory 108, the D/A converter 110, and the display unit 109, thereby performing display control.

An operation unit 113, a first shutter switch 114, a second shutter switch 115, and a mode change switch 116 are operation methods for inputting various operation instructions to the system control unit 107. The operation members of the operation unit 113 are appropriately assigned functions for corresponding scenes by the operation of selecting various function icons displayed on the display unit 109 and act as various function buttons. The function buttons include, for example, an end button, a return button, an advance-image button, a jump button, a narrow-down button, a change-attributes button, and an INFO button. For example, if a menu button is pressed, a menu screen where various settings can be made is displayed on the display unit 109. An operator can intuitively make various settings using the menu screen displayed on the display unit 109, a directional button for four directions, namely up, down, left, and right directions, and a SET button.

The first shutter switch 114 is turned on in an intermediate state of the operation, i.e., by a so-called half press (a photographing preparation instruction), of a shutter button (not illustrated) provided in the digital camera 100 and generates a first shutter switch signal SW1. Based on the first shutter switch signal SW1, the operations of an autofocus (AF) process, an automatic exposure (AE) process, an auto white balance (AWB) process, and a pre-flash (EF) process are started.

The second shutter switch 115 is turned on by the completion of the operation, i.e., by a so-called full press (a photographing instruction), of the shutter button (not illustrated) and generates a second shutter switch signal SW2. Based on the second shutter switch signal SW2, the system control unit 107 starts a series of operations of a photographing process from the reading of a signal from the image capture unit 103 to the writing of image data to a recording medium 121.

The mode change switch 116 switches the operation mode of the system control unit 107 to any one of a still image recording mode, a moving image recording mode, and a reproduction mode. The still image recording mode includes an auto photographing mode, an auto scene distinction mode, a manual mode, various scene modes in which photographing settings are made according to photographing scenes, a program AE mode, and a custom mode. The mode change switch 116 may directly switch the operation mode to any one of these modes included in the still image photographing mode. Alternatively, the mode change switch 116 may once switch the operation mode to the still image photographing mode and then switch the still image photographing mode to any one of these modes included in the still image photographing mode, using another operation member. Similarly, the moving image photographing mode may also include a plurality of modes. A power supply switch 117 is used to switch on and off the power supply.

A power supply unit 118 includes a primary battery such as an alkaline battery or a lithium battery, a secondary battery such as a nickel-cadmium (NiCd) battery, a nickel-metal hydrate (NiMH) battery, or a lithium-ion (Li) battery, or an alternating current (AC) adapter. A power supply control unit 119 includes a battery detection circuit, a direct-current-to-direct-current (DC/DC) converter, and a switch circuit for switching blocks to which to apply a current. The power supply control unit 119 detects the presence or absence of attachment of a battery, the type of a battery, and the remaining life of a battery. Further, the power supply control unit 119 controls the DC/DC converter based on these detection results and an instruction from the system control unit 107 and supplies a voltage to the components including the recording medium 121 for a period of time. A recording medium interface (I/F) 120 is an interface for the recording medium 121 such as a memory card or a hard disk. The recording medium 121 is a recording medium such as a memory card for recording a photographed image and includes a semiconductor memory or a magnetic disk.

The operation unit 113 includes, as one of the operation members, a touch panel capable of detecting contact with the display unit 109. The touch panel is an example of a touch screen. The touch panel and the display unit 109 can be formed in an integrated manner. For example, the touch panel is configured so that the transmittance of light does not hinder the display of the display unit 109. Then, the touch panel is attached to an upper layer of the display surface of the display unit 109. Then, input coordinates on the touch panel are associated with display coordinates on the display unit 109. Consequently, it is possible to configure a graphical user interface (GUI) as if a user can directly operate a screen displayed on the display unit 109.

The system control unit 107 can detect the following operations on the touch panel. The operations include the state of bringing a finger or a pen into contact with the touch panel (hereinafter referred to as a "touch-down"), the state where the finger or the pen is in contact with the touch panel (hereinafter referred to as a "touch-on"), the state of moving the finger or the pen while maintaining the finger or the pen in contact with the touch panel (hereinafter referred to as a "move"), the state of separating from the touch panel the finger or the pen having been in contact with the touch panel (hereinafter referred to as a "touch-up"), and the state where nothing is in contact with the touch panel (hereinafter referred to as a "touch-off"). The system control unit 107 is notified via an internal bus (not illustrated) of these operations and the position coordinates where the finger or the pen is in contact with the touch panel. Based on the information in the notification, the system control unit 107 determines what type of operation is performed on the touch panel.

In the case of a move, the system control unit 107 can also determine, based on changes in the position coordinates, the moving direction of the finger or the pen moving on the touch panel with respect to each of the vertical and horizontal components on the touch panel. Further, if the user continuously performs a touch-down, a certain move, and a touch-up on the touch panel, the user is regarded as drawing a stroke. The operation of quickly drawing a stroke is referred to as a "flick". A flick is the operation of quickly moving a finger some distance while maintaining the finger in contact with the touch panel, and then separating the finger from the touch panel immediately after the quick movement. In other words, a flick is the operation of quickly tracing the touch panel with a finger in a flipping manner. If a move performed a predetermined distance or more at a predetermined speed or more is detected and a touch-up is detected immediately after the move, the system control unit 107 can determine that a flick is performed. Further, if a move performed a predetermined distance or more at less than a predetermined speed is detected, the system control unit 107 determines that a drag is performed. The touch panel may be any of touch panels of various types such as a resistive type, an electrostatic capacitance type, a surface acoustic wave type, an infrared type, an electromagnetic induction type, an image recognition type, and a photosensor type.

Next, with reference to FIGS. 2A to 2D, a description is given of display control processing, performed by the camera 100, on a function setting screen (a display screen) for an AF operation for performing a focus adjustment of the camera 100. Although a description is given based on the AF operation function setting screen in the present exemplary embodiment, a screen to be subjected to the display control processing is not limited to a function setting screen. As another example, the camera 100 may perform display control processing on another screen such as an ISO value setting screen. It is assumed that, in the camera 100, it is possible to set two types of AF operations, namely one-shot AF and AF servo. The one-shot AF is the function of performing a focus adjustment only once when the first shutter switch 114 is pressed. The AF servo is the function of continuing to performing focus adjustments on an object while the first shutter switch 114 is being pressed.

Figure 2A:
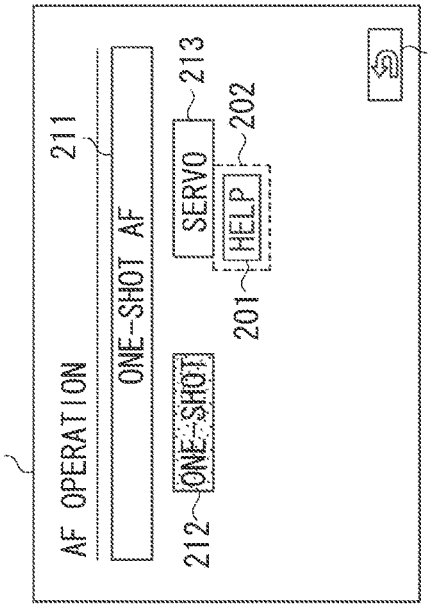
FIGS. 2A, 2B, 2C, and 2D are diagrams illustrating display control processing.

A moving object 201 moves at any moving speed in any moving direction on the display screen in the display unit 109 according to an operation of the user. FIGS. 2A to 2D illustrate the states where the moving object 201 moves in an upper right direction in the display unit 109. For the moving object 201, a response region 202 which is indicated by a dashed line as illustrated in FIG. 2A, is set. The response region 202 is a region for receiving an instruction given to the moving object 201 by the operator performing a touch-down or touch-on operation on the touch panel (the touch screen) as the operation unit 113. More specifically, if a user operation such as a touch-down is performed with respect to the response region 202, the camera 100 determines that an instruction regarding processing associated with the moving object 201 is received. Then, the camera 100 executes the processing associated with the moving object 201.

The response region 202 is a region including the moving object 201 and of a size greater than the size of the display region of the moving object 201. The moving object 201 illustrated in FIGS. 2A to 2D is an object associated with the processing of a help function with which the operator checks necessary information such as how to use the camera 100. Although the response region 202 is clearly illustrated in FIGS. 2A to 2D for convenience of description, the camera 100 may not need to actually display information indicating the response region 202 on the display unit 109.

As AF operation function setting display 211, "one-shot AF" or "AF servo" is displayed as illustrated in FIG. 2A so that the function of an AF operation set in the camera 100 can be understood. Objects 212 and 213 are touch objects for changing the settings of the AF operations of the camera 100. The object 212 is a touch object for setting the one-shot AF, and the object 213 is a touch object for setting the AF servo. Both the objects 212 and 213 are objects that do not move on the display unit 109, i.e., fixed objects the display positions of which are fixed.

It is assumed that for the objects 212 and 213, the same regions as the display regions of the objects 212 and 213 in the display unit 109 are set as the response regions of the objects 212 and 213, respectively. In the camera 100, for a fixed object, the same region as the display region of the fixed object is thus set as the response region of the fixed object. On the other hand, as described above, in the camera 100, for a moving object, a region including the display region of the moving object and larger than the display region is set as the response region of the moving object.

The system control unit 107 acquires position coordinates input by the operator performing a touch-down or touch-on operation on the touch panel of the operation unit 113 and determines, based on the acquired position coordinates, whether an operation is performed in the response region of the object 212 or 213. Then, the system control unit 107 performs processing associated with the object 212 or 213 corresponding to the response region in which an operation is performed according to the determination, i.e., the process of selecting the setting of an AF operation. Further, if an object is in a selected state, the system control unit 107 displays the selected object in a highlighted manner as in the object 212 illustrated in FIGS. 2A to 2D. The object 213 illustrated in FIGS. 2A to 2D is displayed not in a highlighted manner. An end touch object 214 is used to end the screen. If receiving a touch-down or touch-on operation instruction to the end object 214, the system control unit 107 ends the display of the screen for setting AF.

The camera 100 according to the present exemplary embodiment changes the size of the response region 202 of the moving object 201 according to the relationship between the moving object 201 and another or different object. With reference to FIGS. 2A to 2D, a description is given below of an outline of the process of changing the size of the response region 202.

As illustrated in FIG. 2A, if the moving object 201 is distant from each of the other objects 212, 213, and 214 other than the moving object 201, the system control unit 107 of the camera 100 sets the size of the response region 202 to a reference size. At this time, the reference size is a size larger than the size of the display region of the moving object 201 and is the maximum size of the response region 202 of the moving object 201. It is assumed that the reference size is stored in advance in the non-volatile memory 111. The response region 202 is thus made larger than the display region of the moving object 201, whereby, even if a touch operation of the operator is delayed by failing to adjust to the motion of the moving object 201, it is possible to easily make desired selection. Further, the response region 202 is a region that can be set independently, regardless of the display content of the moving object 201. Thus, the screen display does not become complicated. Further, only the response region of a moving object is set to be larger, and the response region of a fixed object that does not move is of the same size as that of the display region of the fixed object, whereby it is possible to minimize the proximity between the response regions.

Figure 2B:
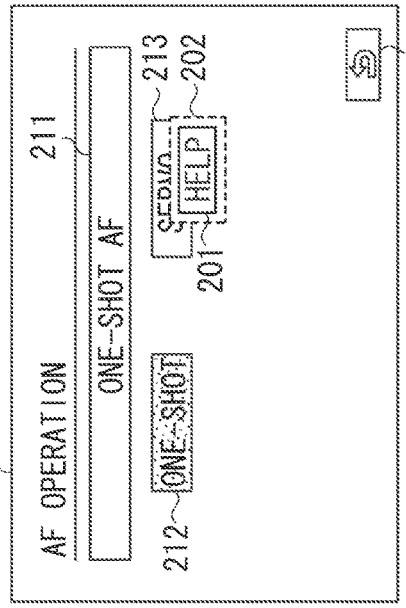

FIG. 2B illustrates the state where the moving object 201 moves to the upper right from the state of FIG. 2A. FIG. 2B illustrates the state where the response region 202 of the moving object 201 overlaps the display region of the object 213. In this case, the system control unit 107 reduces the size of the response region 202. This enables the response region 202 to avoid overlapping the display region of the object 213. This prevents the response region 202 from obstructing a touch operation to the response region of the object 213, and therefore can reduce an operation to a touch object that is not intended by the operator.

Figure 2C:
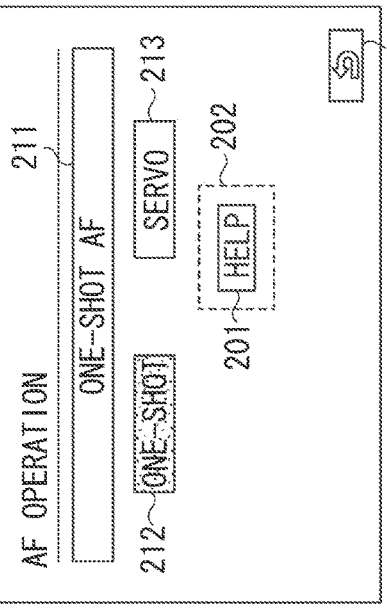

FIG. 2C illustrates the state where the moving object 201 moves further in the upper right direction from the state of FIG. 2B. FIG. 2C illustrates the state where the display region of the moving object 201 is in contact with the display region of the object 213. In this case, the system control unit 107 sets the size of the response region 202 to a size almost equal to that of the display region of the moving object 201.

Figure 2D:
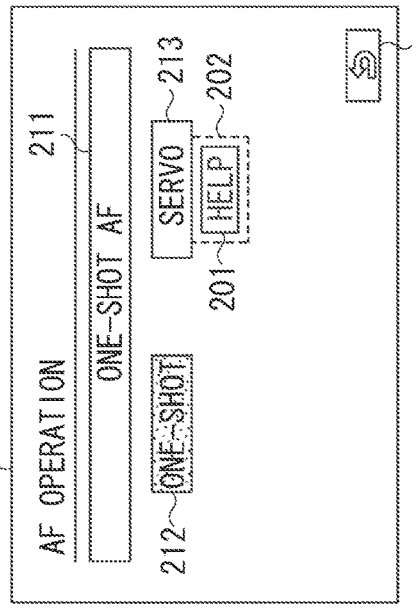

FIG. 2D illustrates the state where the moving object 201 moves further in the upper right direction from the state of FIG. 2C. FIG. 2D illustrates the state where the display region of the moving object 201 overlaps the display region of the object 213. In this case, continuously from the state where the display region of the moving object 201 is in contact with the display region of the object 213, the system control unit 107 sets the size of the response region 202 to a size almost equal to that of the display region of the moving object 201. Also if the moving object 201 moves away from the object 213 again after that, the system control unit 107 determines the size of the response region 202 of the moving object 201 according to the extent of the overlap between the response region 202 and the display region of the object 213 and reduces the size of the response region 202.

It is assumed that the camera 100 according to the present exemplary embodiment further sets the response region 202 so that the response region 202 is not narrower than the display region of the moving object 201. This can prevent a reduction in the operability for the operator when performing a touch operation to the moving object 201. In view of the facilitation of a touch operation to the object 213, however, the camera 100 may reduce the size of the response region 202 to any size smaller than that of the display region of the moving object 201. As described above, the camera 100 can also set the response region 202 so as not to obstruct the response region of the object 213.

Figure 3:
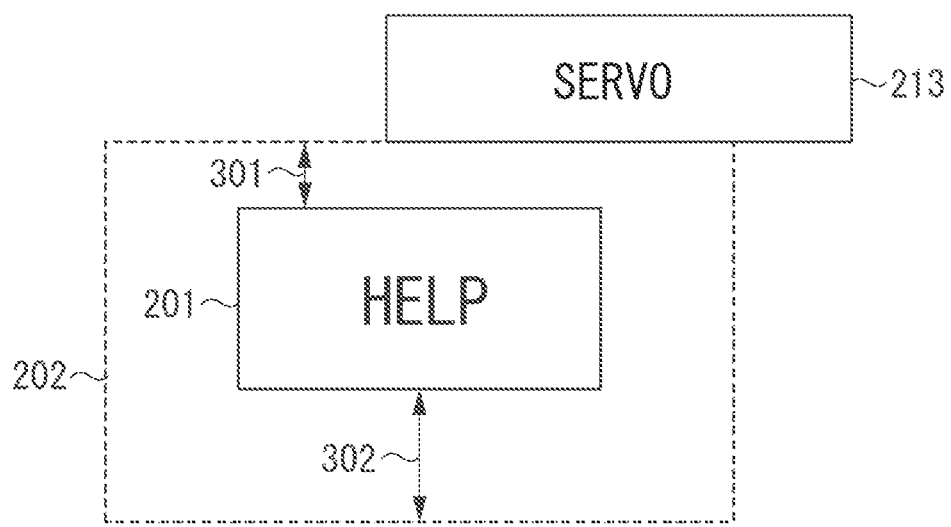
FIG. 3 is a diagram illustrating a process of changing a size of a response region.

Further, in the present exemplary embodiment, it is assumed that the system control unit 107 reduces the size of the response region 202 while maintaining the ratio between the lengths of the response region 202 in the up-down direction and the left-right direction. However, the method by which the system control unit 107 reduces the response region 202 is not limited to that in the exemplary embodiment. For example, as illustrated in FIG. 3, the system control unit 107 may change the response region 202 so that in the response region 202, only a region 301, which overlaps the display region of the object 213, becomes smaller. Meanwhile, the system control unit 107 may not change the boundary position of the response region 202 in another region 302. Consequently, even if a touch operation of the operator to the moving object 201 is delayed, it is possible to perform an operation intended by the operator.

As described above, the camera 100 according to the present exemplary embodiment changes the size of the response region 202 according to the distance between the moving object 201 and another object 212, 213, or 214. Thus, even if a moving object is in proximity with another or different object, it is possible to facilitate a touch operation of the operator.

In the examples of FIGS. 2A to 2D, the objects 212 and 213 are fixed objects the display positions of which are fixed. Alternatively, the objects 212 and 213 may also be moving objects, similarly to the object 201. In this case, the user may be able to select an object to be moved, by performing a long touch to any one of the objects 201, 212, and 213.

Figure 4:
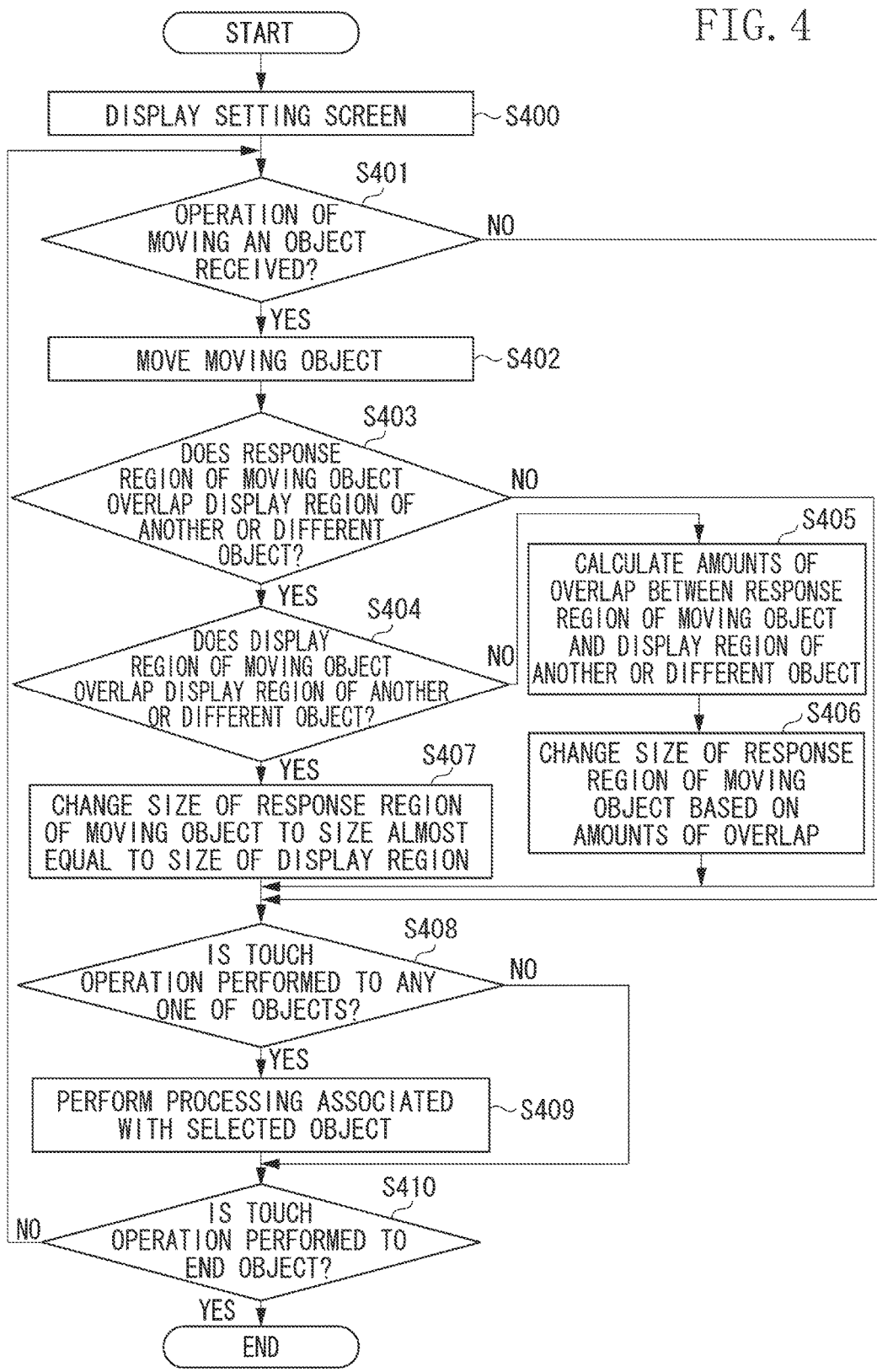
FIG. 4 is a flowchart illustrating the display control processing.

FIG. 4 is a flowchart illustrating the display control processing performed by the system control unit 107 of the camera 100. First, in step S400, the system control unit 107 acquires the setting value of the current AF operation from the non-volatile memory 111, and based on the acquired setting value and screen component items, displays an AF operation function setting screen on the display unit 109. Consequently, the AF operation function setting screen illustrated in FIG. 2A is displayed. At this time, the system control unit 107 further sets a response region for each of the objects (the moving object 201 and the objects 212, 213, and 214) displayed on the function setting screen (a setting process).

Next, in step S401, the system control unit 107 determines whether the operation of moving an object has been received from the user (a reception process). For example, if a move operation (the operation of moving a position while keeping a touch) has been received from the user, the system control unit 107 determines that the operation of moving an object has been received. If the operation of moving an object has been received (Yes in step S401), the processing proceeds to step S402. If the operation of moving an object has not been received (No in step S401), the processing proceeds to step S408. If the operation of moving an object has been received, then in step S402, the system control unit 107 performs a process of moving a moving object. Then, in steps S403 to S407, the system control unit 107 performs a process of changing the response region of the moving object in a case where the moving object overlaps another or different object.

Further, if all the objects 201, 212, and 213 illustrated in FIGS. 2A to 2D can be moved, the system control unit 107 selects as a moving object an object to which the user performs a long touch among the plurality of displayed objects. Then, after selecting a moving object, the system control unit 107 receives the operation of moving the object by a move operation.

Next, in step S402, the system control unit 107 acquires from the non-volatile memory 111 the setting values of the moving direction of the moving object 201 and the amount of movement of the moving object 201 in a single step. Then, based on the acquired setting values, the system control unit 107 moves the display position of the moving object 201 in the display unit 109. In other words, the system control unit 107 updates the display of the display unit 109 to the state after the movement of the moving object 201.

Next, in step S403, the system control unit 107 determines whether the response region 202 overlaps the display region of another or different object (a determination process). At this time, the display region of another or different object is an example of the object region of another or different object. If it is determined that the response region 202 overlaps the display region of another or different object (Yes in step S403), the processing proceeds to step S404. If it is determined that the response region 202 does not overlap the display region of another or different object (No in step S403), the processing proceeds to step S408.

Figure 5:
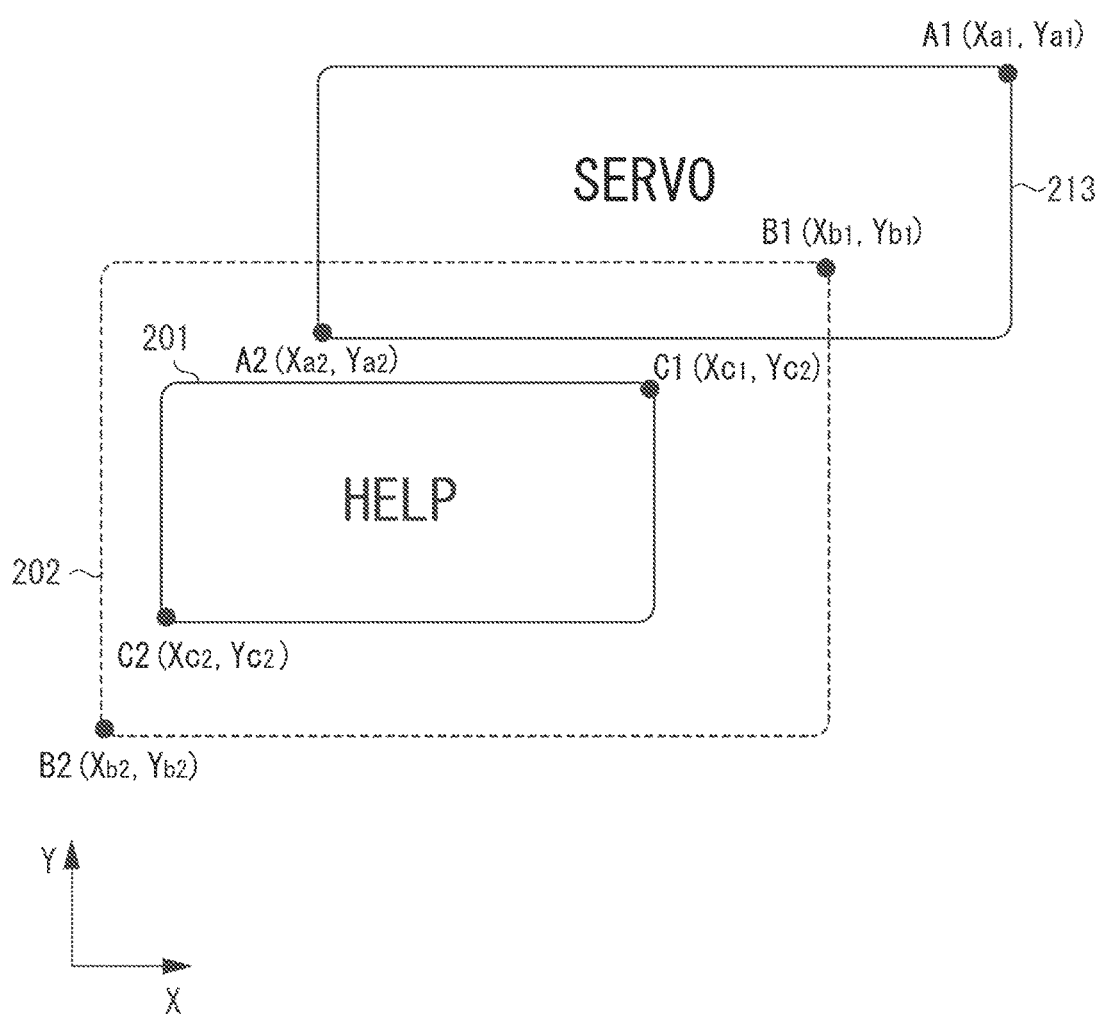
FIG. 5 is a diagram illustrating positional relationships between a display region and a response region of a moving object, and another object.

With reference to FIG. 5, a description is given of the process of determining whether the response region 202 of the moving object 201 overlaps the object 213. The display region of the object 213 and the response region 202 of the moving object 201 are rectangular regions. Thus, in the present exemplary embodiment, the system control unit 107 confirms whether each of the four vertices of the response region 202 is located within the object 213. Then, if at least one of the vertices of the response region 202 is located within the object 213, the system control unit 107 determines that the response region 202 overlaps the display region of the object 213.

A description is given below of the process in which the system control unit 107 determines whether one of the vertices of the response region 202 is located within the object 213. As illustrated in FIG. 5, opposite vertices of the display region of the object 213 are defined as A1 and A2, and the coordinates of the respective vertices are defined as A1 (Xa1, Ya1) and A2 (Xa2, Ya2). Further, opposite vertices of the response region 202 are defined as B1 and B2, and the coordinates of the respective vertices are defined as B1 (Xb1, Yb1) and B2 (Xb2, Yb2). Opposite vertices of the display region of the moving object 201 are defined as C1 and C2, and the coordinates of the respective vertices are defined as C1 (Xc1, Yc1) and C2 (Xc2, Yc2). FIG. 5 illustrates the state where a region including the vertex B1 of the response region 202 overlaps the display region of the object 213.

In this case, if the vertex B1 satisfies the following formulas 1 and 2, the system control unit 107 determines that the vertex B1 is included in the display region of the object 213.

$$Xa2 < Xb1 < Xa1 \quad \text{(formula 1)}$$

$$Ya2 < Yb1 < Ya1 \quad \text{(formula 2)}$$

In the state illustrated in FIG. 5, the vertex B2 satisfies all the following formulas 3 to 6. It is understood from this that the vertex B2 is located outside the display region of the object 213.

$$Xb2 < Xa1 \quad \text{(formula 3)}$$

$$Xb2 < Xa2 \quad \text{(formula 4)}$$

$$Yb2 < Ya1 \quad \text{(formula 5)}$$

$$Yb2 < Ya2 \quad \text{(formula 6)}$$

The system control unit 107 performs a similar process on each of the four vertices of the response region 202, thereby determining whether each of the four vertices of the response region 202 is included in the display region of the object 213. Further, the system control unit 107 determines whether the moving object 201 overlaps each of all the objects displayed on the display unit 109 simultaneously with the moving object 201.

There is a case where as in the examples illustrated in FIGS. 2A to 2D, for example, it is known in advance that among the four vertices of the response region 202 of the moving object 201, the vertex B1 is always included first in the display region of another object 213. In such a case, the system control unit 107 may only determine whether the vertex B1 is included in another object 213, without determining whether each of all the four vertices of the response region 202 is included in another object 213. Then, if the vertex B1 is included in another object 213, the system control unit 107 may determine that the response region 202 overlaps the display region of another object 213. Further, if the vertex B1 is not included in the display region of another object 213, the system control unit 107 may determine that the response region 202 does not overlap the display region of another object 213.

Referring back to FIG. 4, in step S404, the system control unit 107 determines whether the display region of the object 213 overlaps the display region of the moving object 201 (a determination process). Similarly to the process of step S403, the system control unit 107 confirms whether each of the four vertices of the display region is located within the object 213. Then, if at least one of the vertices of the display region of the moving object 201 is located within the object 213, the system control unit 107 determines that the display region of the moving object 201 overlaps the display region of the object 213. If it is determined that the display region of the moving object 201 overlaps the display region of another or different object (Yes in step S404), the processing proceeds to step S407. If it is determined that the display region of the moving object 201 does not overlap the display region of another or different object (No in step S404), the processing proceeds to step S405.

In step S405, the system control unit 107 calculates the amounts of overlap Xn and Yn between the display region of the object 213 and the response region 202. At this time, the amount of overlap Xn is the length of the overlapping region (the overlap region) in an X-direction, and the amount of overlap Yn is the length of the overlap region in a Y-direction. For example, suppose that the vertex B1 of the response region 202 overlaps the display region of the object 213 as illustrated in the display region of the object 213 and the response region 202 in FIG. 5. In this case, the system control unit 107 calculates the amounts of overlap Xn and Yn, using the following formulas 7 and 8.

$$Xn = Xb1 - Xa2 \quad \text{(formula 7)}$$

$$Yn = Yb1 - Ya2 \quad \text{(formula 8)}$$

Next, in step S406, the system control unit 107 changes the size of the response region 202 to a smaller size based on the amounts of overlap Xn and Yn. Then, the processing proceeds to step S408. Specifically, the system control unit 107 specifies the smaller of the amounts of overlap Xn and Yn. Then, the system control unit 107 moves the positions of the sides of the response region 202 to the center side of the display region by the specified amount of overlap. For example, in the example of FIG. 5, Yn is the smaller of the values Xn and Yn. Then, the system control unit 107 changes the vertex B1 to a vertex B1' (Xb1', Yb1'), using the following formulas 9 and 10.

$$Xb1' = Xb1 - Yn \quad \text{(formula 9)}$$

$$Yb1' = Yb1 - Yn \quad \text{(formula 10)}$$

Further, the system control unit 107 changes the vertex B2 to a vertex B2' (Xb2', Yb2'), using the following formulas 11 and 12.

$$Xb2' = Xb2 - Yn \quad \text{(formula 11)}$$

$$Yb2' = Yb2 - Yn \quad \text{(formula 12)}$$

Then, the system control unit 107 saves the coordinates of the vertices B1' and B2' obtained as the calculation results, in the non-volatile memory 111 as information defining the rectangle of a new response region. At this time, the process of step S406 is an example of a change process for reducing the size of the response region according to the extent of the overlap between the response region and the display region of another or different object.

For example, if the display region of the object 213 overlaps the response region 202 as illustrated in FIG. 5, the relationships of the following formulas 13 and 14 hold.

$$Xn > Xb1 - Xc1 \quad \text{(formula 13)}$$

$$Yn < Yb1 - Yc1 \quad \text{(formula 14)}$$

Thus, if the size of the response region 202 was reduced by the amount of overlap Xn in the X-direction to dissolve the overlap between the response region 202 and the display region of the object 213, the boundary position of the response region 202 would be within the moving object 201.

Thus, the system control unit 107 according to the present exemplary embodiment reduces the size of the response region 202 by the smaller value of the amounts of overlap. This can dissolve the overlap between the response region after the change and the display region of another or different object. In other words, the system control unit 107 according to the present exemplary embodiment reduces the size of the response region, thereby changing the response region to a region that does not overlap the display region of another or different object.

In step S407, the system control unit 107 acquires the size of the display region of the moving object 201 from the non-volatile memory 111. Based on the acquired size, the system control unit 107 changes the size of the response region 202 to a size almost equal to the size of the display region of the moving object 201 and saves the changed size of the response region 202 in the non-volatile memory 111. The system control unit 107 thus sets the size of the display region of the moving object 201 to the minimum size and changes the response region 202 to a size equal to or larger than the size of the display region.

Next, in step S408, the system control unit 107 determines whether a touch operation is performed to any one of the objects 212 and 213 and the moving object 201 on the touch panel. In other words, the system control unit 107 determines whether an instruction to select any one of the objects is received. If a touch operation is performed (Yes in step S408), the processing proceeds to step S408. If a touch operation is not performed (No in step S408), the processing proceeds to step S410.

It is assumed that if a moving object is selected by a long touch, operations as a movement operation to be received in step S408 and an operation to be received in step S401 are set to be distinguishable in the camera 100. For example, in the camera 100, a short touch may be set as the operation of touching an object, and a long touch may be set as the operation of moving an object. The short touch is the operation of performing a touch-up within a predetermined time from a touch-down, and the long touch is the operation of continuing a touch for a predetermined time or longer from a touch-down.

In step S409, the system control unit 107 performs processing associated with the object selected by the touch operation according to the determination. At this time, the system control unit 107 updates the screen display, where necessary. Specifically, based on setting values such as the setting value of the AF operation acquired from the non-volatile memory 111 and the setting values of the moving direction and the amount of movement of the moving object, the system control unit 107 performs the process of updating the display of the AF operation function setting screen. This process is similar to the process of step S400.

Next, in step S410, the system control unit 107 determines whether a touch operation is performed to the end object 214. If a touch operation is performed (Yes in step S410), the display control processing ends. If a touch operation is not performed (No in step S410), the processing proceeds to step S401.

A first variation of the camera 100 according to the present exemplary embodiment is described. In the present exemplary embodiment, it is assumed that the response regions of other objects likely to overlap the moving object 201 are approximately the same regions as the display regions of the respective other objects. Alternatively, also for the other objects, regions larger than the display regions of the other objects may be set as the response regions of the other objects. In this case, it is assumed that the response region of an object that does not move, i.e., a fixed object, is smaller than the response region of the moving object.

Further, in this case, in step S403, the camera 100 may determine whether the response region of the moving object 201 overlaps the response region of another object, instead of the display region of another object. In this case, according to the result of the determination of an overlap with the response region of another object, the camera 100 may perform the processes of step S404 and thereafter. Similarly, also in step S404, the camera 100 may determine whether the display region of the moving object 201 overlaps the response region of another object, instead of the display region of another object. Also in this case, according to the result of the determination of an overlap with the response region of another object, the camera 100 may perform the processes of step S405 and thereafter. In this example, the response region of another object is an example of the object region of another object.

As a second variation, when changing the size of the response region, the camera 100 may only need to reduce the size of the response region 202 according to the extent of the overlap, and information used as the extent of the overlap is not limited to the amounts of overlap (Xn and Yn) described in the exemplary embodiment. As another example, the camera 100 may use the area of the overlap portion as the extent of the overlap.

As a third variation, if the response region 202 of the moving object 201 overlaps the display region of another or different object, the camera 100 may only need to reduce the size of the response region 202 of the moving object 201, and the amount of change in the size is not limited to that in the exemplary embodiment. For example, the camera 100 may reduce the size of the response region 202 by an amount determined in advance. Further, as described above, the camera 100 may move, among the boundary lines of the response region 202, only a portion of a boundary line included in the display region of another or different object to further inside the response region 202, thereby reducing the response region 202.

As a fourth variation, the camera 100 may change the size of the response region 202 of the moving object 201 by gradually reducing the size of the response region 202 before the response region 202 overlaps the display region of another or different object.

As a fifth variation, according to the extent of the overlap between the response region 202 of the moving object 201 and the display region of another or different object, the camera 100 may reduce not only the size of the response region 202 but also the size of the display region of the moving object 201. This can improve the operability of a touch operation to each object.

As a sixth variation, although the response region and the display region of another object and the moving object 201 are rectangular, the shape of each region is not limited to this. Further, regardless of shapes, the camera 100 may set coordinates for use in the determination of an overlap according to the shape of each region, determine an overlap between the regions, and calculate the amount of overlap between the regions.

According to the above exemplary embodiments, it is possible to improve the operability for an operator when a moving object overlaps another or different object.

Other Exemplary Embodiments

The present disclosure can also be achieved by the process of supplying a program for achieving the functions of the above exemplary embodiments to a system or an apparatus via a network or a storage medium, and causing one or more processors of a computer of the system or the apparatus to read and execute the program. In other words, a program for achieving the functions of the above exemplary embodiments is also included in the present disclosure. Further, the present disclosure can also be achieved by one or more dedicated or general-purpose processors (e.g., central processing units (CPUs) or application-specific integrated circuits (ASICs)) for achieving the functions of the above exemplary embodiments.

While the present disclosure has been described in detail based on suitable exemplary embodiments, the present disclosure is not limited to these specific exemplary embodiments. The present disclosure also includes various forms without departing from the spirit and scope of the disclosure. Parts of the above exemplary embodiments may be appropriately combined together.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-127892, filed Jun. 25, 2015, which is hereby incorporated by reference herein in its entirety.

What is claimed is:

1. An information processing apparatus comprising: a touch panel; and one or more processors that, when executing instructions, causes the apparatus to:
   perform control so that a moving object and a different object from the moving object are displayed on a display screen of the touch panel,
      wherein a display position of the moving object can be moved and a display position of the different object cannot be moved,
      wherein each of the moving object and the different object are selectable to perform a function of the apparatus;
   set a response region for receiving a touch operation with respect to the moving object,
      wherein the response region has a first size;
   detect a move instruction to change the display location of the moving object;
   in response to the move instruction, determine an amount of overlap of the moving object and the different object, the amount of overlap including an overlap of the response region;
   determine whether the moving object overlaps the different object as a result of the change of the display position of the moving object the determination based on the amount of overlap; and
   in response to determining that the moving object overlaps the different object, reduce the first size of the response region of the moving object based on the amount of the overlap to a second size wherein the second size of the response region is smaller than the first size of the response region before the moving object overlaps the different object.

2. The information processing apparatus according to claim 1, wherein, the first size is set larger than a size of a display region of the moving object and the second size of the response region is reduced to approximately the same as the size of the display region of the moving object.

3. The information processing apparatus according to claim 1, wherein, the amount of overlap of the moving object and the different object is based on an amount of overlap of the response region of the moving object and a display region of the different object.

4. The information processing apparatus according to claim 1, wherein the apparatus receives an instruction to select the moving object from among a plurality of objects displayed on the display screen.

5. The information processing apparatus according to claim 1, wherein the second size of the response region of the moving object is smaller than the first size of the response region and larger than a size of a display region of the moving object.

6. The information processing apparatus according to claim 1,
   wherein, the amount of overlap is based on an amount of overlap of between the response region of the moving object and a response region of the different object; and
   wherein the decrease of the size of the response region of the moving object causes the overlap between the response region of the moving object and the response region of the different object to dissolve.

7. A method for controlling an information processing apparatus including a touch panel, the method comprising:
   performing control so that a moving object and a different object from the moving object are displayed on a display screen of the touch panel,
      wherein a display position of the moving object can be moved and a display position of the different object cannot be moved,
      wherein each of the moving object and the different object are selectable to perform a function of the apparatus;
   setting a response region for receiving a touch operation with respect to the moving object,
      wherein the response region has a first size;
   detecting a move instruction to change the display location of the moving object;
   in response to the move instruction, determining an amount of overlap of the moving object and the different object, the amount of overlap including an overlap of the response region;
   determining whether the moving object overlaps the different object as a result of the change of the display position of the moving object, the determination based on the amount of overlap; and
   in response to determining that the moving object overlaps the different object, reducing the first size of the response region of the moving object based on the amount of the overlap to a second size, wherein the second size of the response region is smaller than the first size of the response region before the moving object overlaps the different object.

8. A non-transitory computer-readable storage medium storing thereon a computer-executable program for executing a method for controlling an information processing apparatus including a touch panel, the method comprising:
   performing control so that a moving object and a different object from the moving object are displayed on a display screen of the touch panel,
      wherein a display position of the moving object can be moved and a display position of the different object cannot be moved,
      wherein each of the moving object and the different object are selectable to perform a function of the apparatus;

setting a response region for receiving a touch operation with respect to the moving object,
  wherein the response region has a first size;
detecting a move instruction to change the display location of the moving object;
in response to the move instruction, determining an amount of overlap of the moving object and the different object, the amount of overlap including an overlap of the response region;
determining whether the moving object overlaps the different object as a result of the change of the display position of the moving object, the determination based on the amount of overlap; and
in response to determining that the moving object overlaps the different object, reducing the first size of the response region of the moving object based on the amount of the overlap to a second size, wherein the second size of the response region is smaller than the first size of the response region before the moving object overlaps the different object.

* * * * *